| United States Patent [19] | [11] 4,145,658 |
|---|---|
| Acampora et al. | [45] Mar. 20, 1979 |

[54] METHOD AND APPARATUS FOR CANCELLING INTERFERENCE BETWEEN AREA COVERAGE AND SPOT COVERAGE ANTENNA BEAMS

[75] Inventors: Anthony Acampora, Freehold; Douglas O. J. Reudink, Sea Girt; Yu S. Yeh, Freehold Township, Monmouth County, all of N.J.

[73] Assignee: Bell Telephone Laboratories, Incorporated, Murray Hill, N.J.

[21] Appl. No.: 803,151

[22] Filed: Jun. 3, 1977

[51] Int. Cl.$^2$ .............................................. H04B 7/04
[52] U.S. Cl. ................................... 325/180; 325/158; 343/100 ST; 343/208
[58] Field of Search ............... 325/180, 156, 157, 158, 325/4; 343/100 ST, 208, 112 TC, 854

[56] References Cited

U.S. PATENT DOCUMENTS

| Re. 27,478 | 9/1972 | Battail et al. | 325/304 |
|---|---|---|---|
| 2,520,184 | 8/1950 | Ullrich | 343/100 R |
| 3,094,695 | 6/1963 | Jahn | 343/100 LE |
| 3,369,235 | 2/1968 | Odams et al. | 343/100 |
| 3,406,401 | 10/1968 | Tillotson | 343/100 ST |
| 3,541,553 | 11/1970 | Gubin | 343/100 ST |
| 3,673,497 | 6/1972 | Thrasher | 325/180 |
| 3,696,429 | 10/1972 | Tressa | 343/180 |
| 3,710,255 | 1/1973 | Gicca | 325/4 |
| 3,711,855 | 1/1973 | Schmidt et al. | 343/100 ST |
| 3,987,444 | 10/1976 | Masak et al. | 343/100 LE |

*Primary Examiner*—T.H. Tubbesing
*Assistant Examiner*—Lawrence Goodwin
*Attorney, Agent, or Firm*—Erwin W. Pfeifle

[57] ABSTRACT

The present invention relates to method and apparatus for substantially cancelling interference between signals using the same frequency spectrum which are received via overlapping area coverage and spot coverage antenna beams. At the transmitter where the overlapping area and spot coverage beams are concurrently transmitted, a predetermined portion of the area coverage signal is coupled into each of the spot beam signals which will be overlapped at the associated spot beam receiver area by the area coverage beam. The predetermined portion coupled into each spot beam signal will have a magnitude and phase to substantially cancel the area coverage signal at the associated spot beam receiver area.

6 Claims, 5 Drawing Figures

METHOD AND APPARATUS FOR CANCELLING INTERFERENCE BETWEEN AREA COVERAGE AND SPOT COVERAGE ANTENNA BEAMS

BACKGROUND OF THE INVENTION

1. Field of the Invention

The present invention relates to method and apparatus for substantially cancelling interference between two overlapping antenna radiated beams which are transmitted in the same direction and destined for two different receivers and, more particularly, to method and apparatus for cancelling interference between overlapping area coverage and spot coverage antenna radiated beams using the same frequency spectrum at the spot beam receiving stations.

2. Description of the Prior Art

In a domestic satellite communication system the coexistence of spot and area coverage beams can be desirable. For example, a separate spot coverage beam can be used for communication between the satellite and each high traffic ground station while an area coverage beam can be used for communication between the satellite and a plurality of low traffic ground stations under conditions where it might not be desirable to interconnect the individual low traffic ground stations to a nearest high traffic ground station for access to the satellite system. To avoid signal degradation and permit separation of the overlapping spot coverage and area coverage beams, especially at each spot coverage receiving station, a typical prior art technique would be to use separate bandwidths or polarizations, if possible, for the spot coverage beams and the area coverage beam. Using separate bandwidths, however, results in inefficient use of the frequency spectrum and different polarizations may not be available where dual polarized beams are already used by each of the beams of the satellite system.

Various techniques have been devised to suppress interference between two beams arriving at a receiver from separate directions. In this regard see, for instance, U.S. Pat. No. 2,520,184 issued to E. H. Ullrich on Aug. 29, 1950; U.S. Pat. No. 3,094,695 issued to D. M. Jahn on June 18, 1963; U.S. Pat. No. 3,369,235 issued to C. E. Odams et al on Feb. 13, 1968 and U.S. Pat. No. 3,987,444 issued to R. J. Masak et al on Oct. 19, 1976. Since the area and spot coverage beams transmitted from a satellite arrive at each spot beam ground station from the same direction, techniques for separating signals arriving from different directions are not usable.

An alternative technique to enable reception of two or more signals at an FM receiver would be to modulate the carrier of each transmitter with a separate address frequency that is assigned to an associated receiver as disclosed, for example, in U.S. Pat. No. Re. 27,478 issued to G. P. Battail et al on Sept. 19, 1972. Such arrangement may be applicable to FM communication systems but does not appear applicable to a digital communication system.

The problem remaining in the prior art is to provide a technique which permits overlapping spot and area coverage beams which use the same frequency band to be separated at an overlapped receiving station.

SUMMARY OF THE INVENTION

The present invention relates to method and apparatus for substantially cancelling interference between two overlapping antenna radiated beams which are transmitted in the same direction and destined for two different receivers and, more particularly, to method and apparatus for cancelling interference between overlapping area coverage and spot coverage antenna radiated beams, which use the same frequency spectrum, at the spot beam receiving stations.

It is an aspect of the present invention to effect cancellation of interference between overlapping area coverage and spot coverage antenna radiated beams which use the same frequency spectrum by coupling a portion of the area coverage signal into each of the spot coverage radiated signals in a manner to cause cancellation at each spot beam receiver between the signal received directly from the area coverage beam and the received portion of the area coverage signal forming part of the spot coverage received beam.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

The present invention has been described primarily in relationship to a satellite communication system to enable the concurrent use of an area coverage satellite radiated beam and a plurality of spot coverage satellite radiated beams where all of the beams use the same frequency spectrum and the spot coverage beams are received within the area encompassed by the area coverage beam. However, it will be understood that such description is exemplary only and is for the purpose of exposition and not for purposes of limitation. It will be readily appreciated that the inventive concept described is equally applicable to other radiated wave transmission systems which comprise two or more beams which have different destinations but interfere with each other at one or more of the destinations.

Figure 1:
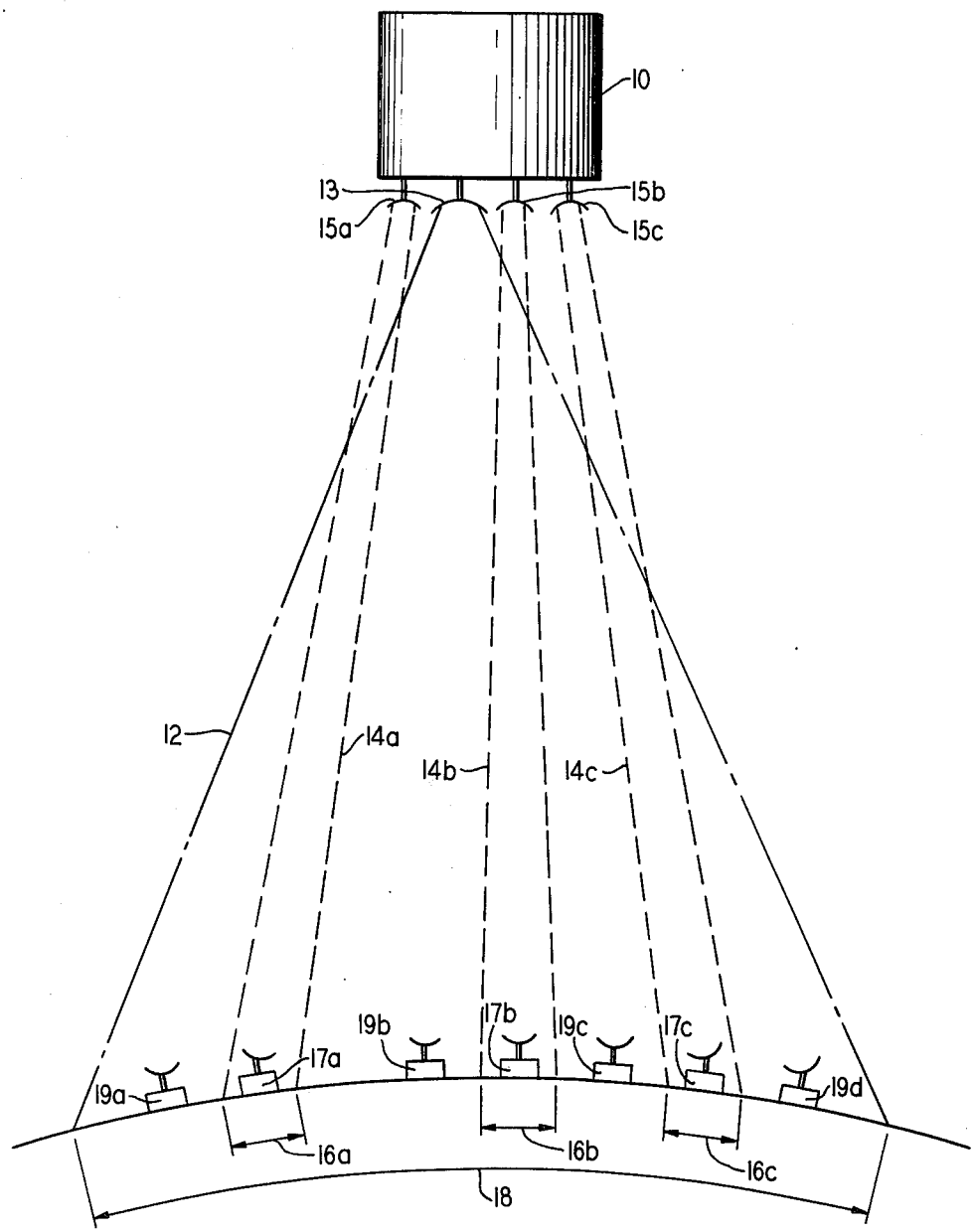
FIG. 1 diagrammatically illustrates a satellite communication system for providing both an area coverage beam and a plurality of spot coverage beams between the satellite and the associated ground receiver stations.

In FIG. 1, a satellite communication system is illustrated wherein the present invention is especially useful to permit the concurrent transmission from a satellite 10 of both an area coverage beam 12 and a plurality of spot coverage beams of which, for example, three beams 14a, 14b and 14c are shown with all beams being able to use the same frequency spectrum. Spot coverage beams 14a, 14b and 14c are shown radiating from antennae 15a, 15b and 15c, respectively, and directed at respective ground areas 16a, 16b and 16c which include, for example, high traffic ground stations 17a, 17b and 17c, respectively. Area coverage beam 12 is shown radiating from an antenna 13 and directed at a ground area 18 which includes both the ground areas 16a, 16b and 16c and a plurality of low traffic ground stations of which, for example, four stations 19a–19d are shown. In the satellite communication system of FIG. 1, each of the high traffic ground stations 17a–17c communicates with satellite 10 via a separate spot beam 14a–14c, respectively, while the low traffic ground stations 19a–19d communicate with satellite 10 via common area coverage beam 12 using any suitable technique to assure that a particular message will be processed by only the appropriate one of stations 19a–19d. Such arrangement permits low traffic ground stations 19a–19d to communicate with satellite 10 under conditions where it is not advantageous to connect a low traffic ground station 19 to a nearby one of high traffic ground stations 17a–17c.

It can be seen from FIG. 1 that when area coverage beam 12 and spot coverage beams 14a–14c are transmitted concurrently and use the same frequency spectrum that each of ground stations 17a–17c will receive both the associated one of spot coverage beams 14a–14c and area coverage beam 12 since these beams emmanate from approximately the same point and most probably the same antenna rather than separate antennas as shown in FIG. 1. Under such conditions the use of prior art arrangements such as, for example, side lobe suppression arrangements to select a wave received from a particular direction over waves received from other directions is not feasible.

Figure 2:
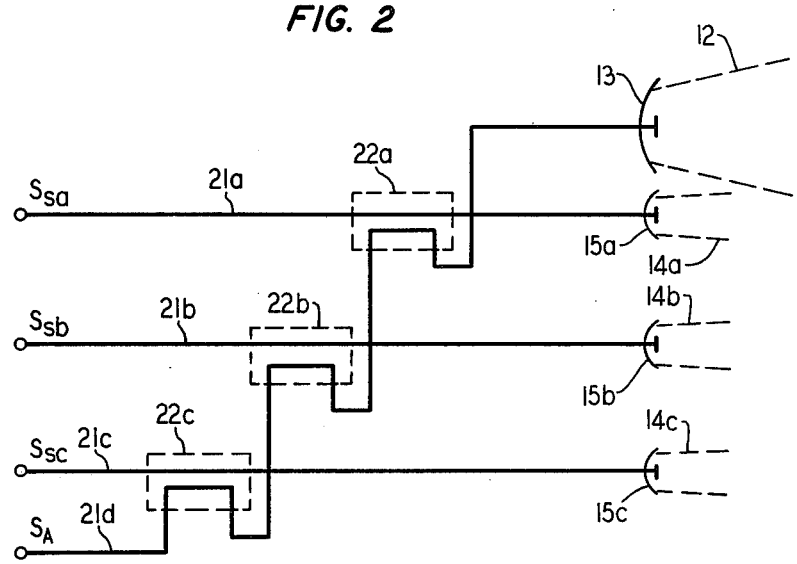
FIG. 2 illustrates an arrangement according to the present invention to effect interference cancellation of the area coverage beam at each of the spot coverage receiver stations.

The concurrent transmission of area coverage beam 12 and a plurality of spot coverage beams 14a–14c using the same frequency spectrum can be effected in accordance with the present invention by the arrangement shown in FIG. 2. For purposes of explanation, $S_s$ represents the signal intended for a particular spot beam antenna 15 with a field pattern $E_s(\theta)$. More particularly, signals $S_{s_a}$, $S_{s_b}$ and $S_{s_c}$ propagate in wavegude 21a, 21b and 21c, respectively, to respective antennae 15a, 15b and 15c for radiation to respective ground stations 17a–17c via spot coverage beams 14a, 14b and 14c, respectively. The field pattern $E_s(\theta)$ for each of the spot coverage beams 14 is assumed to be of Gaussian shape as, for example, in the main lobe of a paraboloid fed by a corrugated feedhorn, and is given by:

$$E_s(\theta) = E_s(0) e^{-\frac{1}{2}(0.833\, \theta/\theta_{3\,dB})^2}, \quad (1)$$

where $E_s(O)$ is in the magnitude of the field along the axis of each spot coverage beam 14. Additionally, $S_A$ represents the signal intended for area coverage beams 12 and is shown propagating in waveguide 21d to antenna 13 for radiation to ground stations 19 via area coverage beam 12 which has a field pattern $E_A(\theta)$ which is given by $$E_A(\theta) = E_A(O), \quad (2)$$

where $E_A(O)$ is the magnitude of the field along the axis of area coverage beam 12.

Since $E_A(\theta)$ represents the field pattern over area 18 of FIG. 1, it is desirable to produce a "hole" in $E_A(\theta)$ in the areas 16a–16c where the spot coverage beams 14a–14c exist such that $E_A$ does not interfere with each of the $E_s$ patterns. In accordance with the present invention, interference between the signal $S_A$ transmitted via area coverage beam 12 and each of signals $S_{s_a}$, $S_{s_b}$ and $S_{s_c}$ transmitted via spot coverage beams 14a, 14b and 14c, respectively, is substantially reduced at each of the spot beam ground stations 17 by coupling a portion of the area coverage signal, $S_A$, propagating in waveguide 21d, into each of the spot coverage signals $S_{s_a}$, $S_{s_b}$ and $S_{s_c}$ propagating in waveguides 21a–21c, respectively, using respective directional couplers 22a, 22b and 22c. To accomplish such interference cancellation at each of ground stations 17, each of couplers 22a–22c should preferably have a negative coupling coefficient of approximately between one and two times the value of $E_A(O)/E_s(O)$. For example, for a negative coupling coefficient of 1.21, the radiated signal for area beam 12 and one of spot beams 14a–14c in the vicinity of the associated spot beam ground station 17 then becomes $$y(\theta) = E_A(\theta)\left[1 - 1.21 \frac{E_A(O)}{E_s(O)} \frac{E_s(\theta)}{E_A(\theta)}\right] S_A + \quad (3)$$
$$E_s(\theta)\left[1 - 1.21 \frac{E_A(O)}{E_s(O)} \frac{E_A(\theta)}{E_s(\theta)}\right] S_s$$

Since $E_s(O) >> E_A(O)$, Equation (3) can be simplified to $$y(\theta) \simeq E_A(\theta)\left[1 - 1.21 \frac{E_s(\theta)}{E_s(O)}\right] S_A + E_s(\theta) S_s. \quad (4)$$

Figure 3:
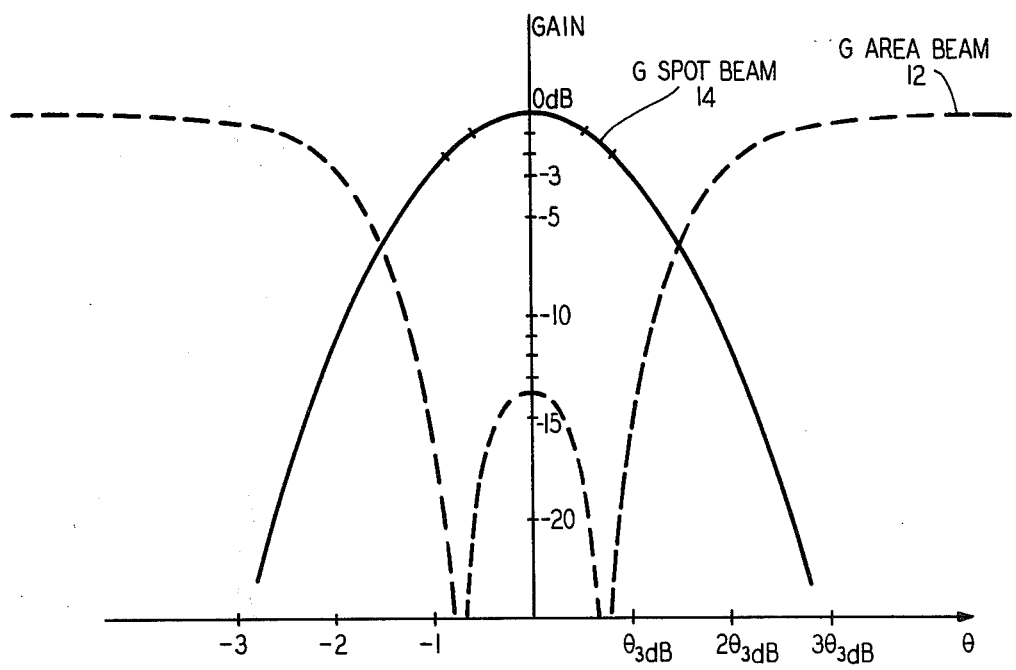
FIG. 3 is a curve illustrating the antenna pattern of a spot coverage beam and a modified area coverage beam in the area of a spot coverage ground station according to the present invention.

The normalized power patterns for both a spot and the area coverage beams are $$|E_s(\theta)/E_s(O)|^2 \text{ and } |E_A(\theta)(1 - 1.21 \frac{E_s(\theta)}{E_s(O)})/E_A(O)|^2$$

and are shown in FIG. 3. From FIG. 3 it can be seen that the spot coverage beam 14 remains unchanged when received at associated area 16 whereas the area coverage beam 12 is significantly reduced in the spot coverage beam region 16.

Figure 4:
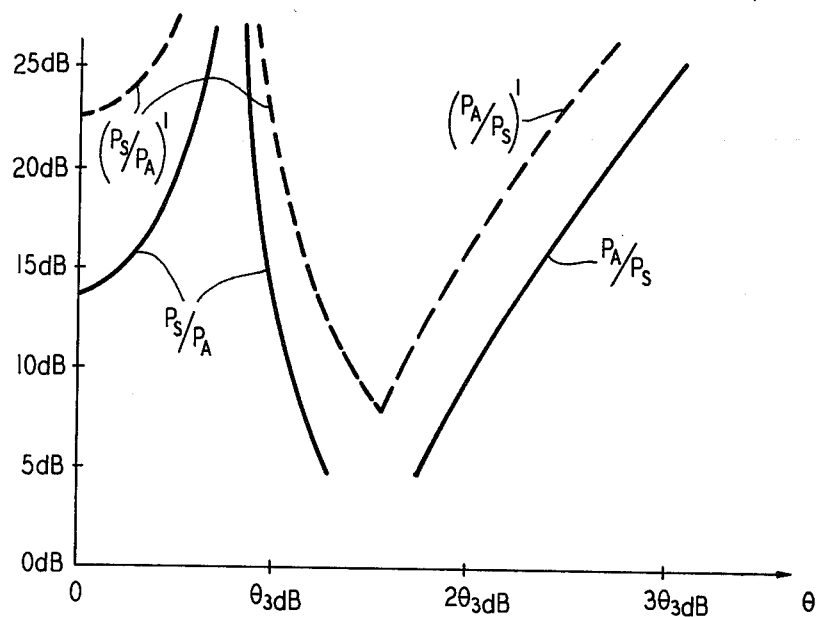
FIG. 4 is a curve illustrating the Signal-to-Interference ratio at the ground stations between a spot coverage beam and the modified area coverage beam in accordance with the arrangement of FIG. 2.

If it is assumed that 4Φ-PSK modulation of the same baud rate is used in both beams and that the Effective Instantaneous Radiated Power (EIRP) at beam peaks are the same, i.e., $<|E_A(O)S_A|^2> = <|E_s(O)S_s|^2>$, the signal to interference ratio (S/I) at the ground defined by $P_A/P_s$ or $P_s/P_A$ is shown in FIG. 4 by a solid line, where $$P_A = \text{received power of } S_A \left(\left|E_A(\theta)[1 - 1.21 \frac{E_s(\theta)}{E_s(O)}]S_A\right|^2\right)$$

and $P_s$ = received power of $S_s(|E_s(\theta) S_s|)$. From FIG. 4, it can be seen that if $S/I > 14$ dB is acceptable, the far field region breaks down to

| | |
|---|---|
| $0 \leq \theta \leq \theta_{3\,dB}$ | Spot Beam ($P_s/P_A > 14$ dB) |
| $\theta_{3\,db} \leq \theta \leq 2.25\, \theta_{3\,dB}$ | Blackout region |
| $2.25\, \theta_{3\,dB} \leq \theta$ | Area Beam ($P_A/P_s > 14$ dB) |

The blackout region is that area which is serviceable by neither the area beam nor the spot beam because of mutual interference between the two beams. The traffic terminating in the blackout region at the edge of each of spot beam regions 16 may have to be trunked on the ground via other stations in the neighboring region.

Figure 5:
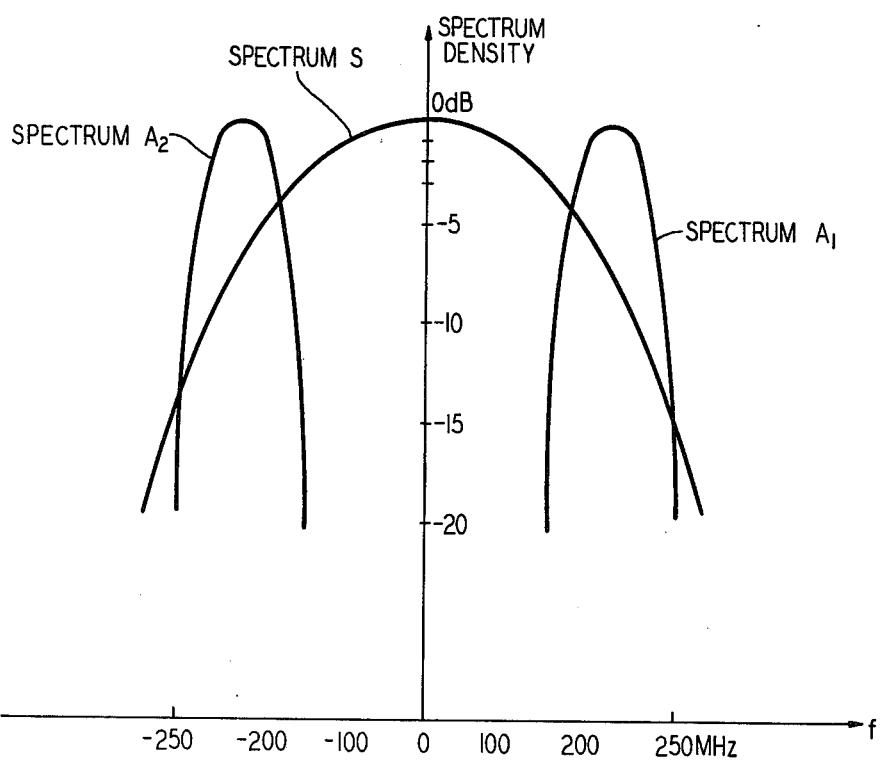
FIG. 5 is a curve illustrating the power spectrum of a 4Φ-PSK signals for a 300 Mbauds spot beam and two 75 Mbauds area beams in accordance to the present invention.

If advantage is taken of the spectrum shape of the 4Φ-PSK signal, the blackout region can be reduced or the S/I may be increased. For example, the capacity of the area coverage beam can be reduced by a factor of two and the modulations can be placed at the edges of the allocated 500 MHz bandwidth of the satellite downlink. The power spectrums of a 300 Mbauds spot coverage beam and two 75 Mbauds area beams are shown in FIG. 5. It should be noted that a ground station 19, intended to receive the area coverage beam 12, will have a receiving filter having characteristics which follow either spectrum $A_1$ or $A_2$. Therefore, the received interference power of $S_s$ is reduced by about 6 dB due to this offsetting of modulation spectrum. Similarly, a ground station 17 intended to receive $S_s$ will have a receiving filter having characteristics which follow spectrum S in FIG. 5. The received power of $S_A$ is reduced by about 9 dB compared to that of $S_s$.

Taking into account both the S/I improvement obtained by spectrum offsetting (FIG. 5) and the antenna pattern discrimination, the resultant $(P_s/P_A)'$ and $(P_A/P_s)'$ are shown by a dashed line in FIG. 4.

In FIG. 4 it can be seen that the blackout region is reduced using spectrum offsetting and antenna pattern discrimination. Again for S/I>14 dB, the regions for $(P_s/P_A)'$ and $(P_A/P_s)'$ becomes:

| | |
|---|---|
| $0 < \theta < 1.2\, \theta_{3\,dB}$ | Spot Beam $(P_s/P_A)' > 14$ dB |
| $1.2\, \theta_{3\,dB} \leq \theta \leq 1.85\, \theta_{3\,dB}$ | Blackout region |
| $1.85\, \theta_{3\,dB} \leq \theta$ | Area Beam $(P_A/P_s)' > 14$ dB |

Compared to the previous case using only the arrangement of FIG. 2, the blackout region has been reduced to $(1.85-1.2)^2/(2.25-1)^2=27$ percent. Or, if maintaining the same blackout region, the minimum S/I in the serviceable region would be higher than 20 dB.

It is to be understood that the above described embodiments are simply illustrative of the principles of the invention. Various other modifications and changes may be made by those skilled in the art which will embody the principles of the invention and fall within the spirit and scope thereof.

What is claimed is:

1. A method of effecting substantial cancellation of interference between a first and a second signal concurrently transmitted in a first and a second antenna radiated beam, respectively, where the first and second signals include different informational content and use the same frequency spectrum and the first and second beams overlap each other in the area of a receiver desiring to receive only the first signals, the method comprising the step of:

at the transmitter (a) coupling a predetermined portion of the second signal to be transmitted in the second beam into the signal to be transmitted by the first beam, said predetermined portion of the coupled-in second signal having a magnitude and phase to substantially cancel, after propagation in the first beam to the receiver, the second signal arriving in the second beam at the receiver.

2. The method according to claim 1 wherein prior to step (a) performing the steps of (b) providing a signal capacity for the second beam which is less than the signal capacity of the first beam; and (c) modulating the second beam signal in a manner to divide the power spectrum for the second beam signal into two portions with each portion disposed both within the frequency spectrum of the first beam and near separate edges of said frequency spectrum.

3. A transmitter for effecting substantial cancellation of interference between a first and a second signal concurrently transmitted in a first and a second antenna radiated beam, respectively, where the first and second signals include different informational content and use the same frequency spectrum and the first and second beams overlap each other in the area of a receiver desiring to receive only the first signals, the transmitter comprising first antenna means capable of transmitting the first beam with a predetermined field pattern $E_s(\theta)$ in the direction of the receiver desiring to receive only the first signals;

second antenna means capable of transmitting the second beam with a predetermined field pattern $E_A(\theta)$ which overlaps said first beam field pattern in the area of the receiver desiring to receive only the first signals;

a first transmission line capable of delivering the signal to be transmitted in the first beam to said first antenna means;

a second transmission line capable of delivering the signal to be transmitted in the second beam to said second antenna means; and coupling means disposed between said first and second transmission lines arranged to couple a predetermined portion of the second signal propagating in said second transmission line into said first transmission line for transmission in the first beam, said predetermined portion of the second signal coupled into said first transmission line having a magnitude and phase to substantially cancel the second signal transmitted in the second beam arriving at the receiver.

4. A transmitter according to claim 3 wherein said coupling means comprises a directional coupler having a predetermined negative coupling coefficient.

5. A transmitter according to claim 4 wherein said predetermined negative coupling coefficient has a value approximately equal to between one and two times the factor $E_A(O)/E_s(O)$, where $E_s(O)$ and $E_A(O)$ are the magnitude of the fields along the axes of the first and second antenna radiated beams, respectively.

6. A transmitter according to claim 3 wherein the second beam is provided with a capacity which is less than the signal capacity of the first beam; and the transmitter further comprises modulating means capable of modulating the second beam signal in a manner to divide the power spectrum for the second beam signal into two portions with each portion disposed both within the frequency spectrum of the first beam and near separate edges of said frequency spectrum.

* * * * *